Sept. 16, 1969 M. F. GRANT 3,467,861

WIDE FREQUENCY RANGE SINGLE-CONTROL OSCILLATOR

Filed May 2, 1967 3 Sheets-Sheet 1

INVENTOR
MICHAEL P. GRANT

BY
Cushman, Darby & Cushman
ATTORNEYS

WIDE FREQUENCY RANGE SINGLE-CONTROL OSCILLATOR

Filed May 2, 1967

INVENTOR
MICHAEL P. GRANT

BY Cushman, Darby & Cushman
ATTORNEYS

INVENTOR
MICHAEL P. GRANT
BY Cushman, Darby & Cushman
ATTORNEYS 3,467,861
WIDE FREQUENCY RANGE SINGLE-CONTROL OSCILLATOR Michael F. Grant, Columbus, Ohio, assignor to Industrial Nucleonics Corporation, a corporation of Ohio
Filed May 2, 1967, Ser. No. 635,434
Int. Cl. G01r *27/26;* H03b *3/04*
U.S. Cl. 324—61 21 Claims

ABSTRACT OF THE DISCLOSURE

A wide frequency range single control oscillator suitable for use in constant-phase or variable-phased dielectric material gauging systems or in any other application in which a wide frequency variation in response to a single control is desirable. The oscillator comprises a variable frequency master oscillator, a frequency divider chain connected to said master oscillator for generating a plurality of alternating voltages having fractionally related frequencies and means responsive to a single input control for selectively connecting individual ones of said plurality of alternating voltages to an output terminal, and further, means for varying the frequency of said master oscillator in accordance with said single input control such that the frequency of the output at said output terminal varies in a continuous manner in response to said single input control. And the combination of such an oscillator with said dielectric material gauging systems.

This invention relates to wide frequency range oscillators and more particularly to wide frequency range oscillators of the single control type. The present invention further relates to the use of such oscillators in dielectric gauging apparatus such as that shown in copending patent application Ser. No. 563,466, filed July 7, 1966, by Henry T. Jaggers and Michael P. Grant.

In a constant-phase or variable-phase dielectric material gauging system as discussed in the aforementioned patent application, a variable frequency alternating source and detector are electrically coupled to the material to be gauged by means of a probe having spaced electrodes. The applied voltage from the source produces a complex current through the probe which is detected by the detector to provide a signal which has a phase shift dependent on a variable property of the material, such as its moisture content, which is to be measured. The phase shift is also dependent on the frequency of the source which provides the input voltage. By utilizing a form of negative feedback, the frequency of the input voltage source is continuously and automatically adjusted to maintain the phase shift of the electric signal substantially constant with respect to a reference value.

In many dielectric materials gauging applications, the measured property of the material is normally expected to vary over a considerable range. In the measurement of percentage moisture content in paper which is continuously produced by a paper making machine, for example, the percent moisture may be subject to rather wide variations, say, from 2 or 3% to perhaps 12 to 15% during a given run of paper. In a constant phase moisture gauge, as shown in the aforementioned application Ser. No. 563,466, which is to measure this wide range of moisture content, the restriction to a single fixed value for the reference phase shift parameter imposes the requirement that the oscillator be capable of operation over a very wide range of frequencies. Satisfactory performance of conventionally designed oscillators, however, is usually limited to a much smaller range of operating frequencies, especially at the lower end of the frequency scale.

Many solutions to this problem of extreme frequency variations have been suggested, including manual range switching of the frequency of the alternating voltage source and/or the magnitude of the reference phase shift parameter. These manual solutions, however, are wholly unsatisfactory in situations where the characteristic being gauged varies in a rapid fashion over a wide range of values.

In said aforementioned application Ser. No. 563,466, an automatic variation in the reference phase shift parameter was suggested, and accomplished, by employing a frequency dependent phase shift element or elements in the reference phase shift parameter network. This solution provides very satisfactory results, however, the range of variations in the characteristic which can be measured is still limited to the frequency range of the variable frequency alternating voltage source.

The present invention provides a novel oscillator suitable for use in the dielectric materials gauging systems of the aforementioned patent application, which is capable of generating a wide range of frequencies in response to a single input control. The present invention further provides an oscillator which is capable of generating an output signal having a substantially constant amplitude and a frequency the logarithm of which is proportional to the input control. This logarithmic response is particularly useful in dielectric gauging apparatus in view of the fact that the characteristic being gauged, such as moisture, is a logarithmic function of the dielectric property. The frequency of the oscillator therefore will be directly proportional to the moisture content of the materials being gauged and the requirement for a frequency logger in the systems of the aforementioned application will be eliminated. The oscillator of the present invention is also particularly useful in the laboratory as it provides a wide frequency range output in response to a single control knob, thereby eliminating the decade or range switching requirement of known oscillators.

Many single control, wide frequency range oscillators have been developed in the prior art, such as beat frequency oscillators for example. The known oscillators, however, operate at relatively high frequencies and are not suitable for use in the frequency range of 1 kc. or lower. This oscillator provides a substantially unlimited output frequency range with uniform accuracy from the lowest frequency available to the highest frequency.

The oscillator of the present invention comprises a frequency divider chain having $n$ counting stages, each of which is effective to divide the frequency input thereto by a factor of N. The term $n$ is an integer and represents the number of stages in the frequency divider chain. The term $n$ may be small or large, depending upon the output frequency range desired. The output frequency range increases as $n$ increases. The term N represents the mode of each counting stage, i.e. binary, tertiary, etc. For the binary mode, N is 2 and for the tertiary mode N is 3. This frequency divider chain is driven by a variable frequency master oscillator which is capable of producing an output frequency, variable at least, between a first predetermined frequency $f1$, and a second frequency $f2$, where $f2/f1=N$.

The present invention further provides means for selectively connecting the output of each stage of the frequency divider chain to the output terminal of the oscillator in accordance with successive differential increments of a single input control signal. In this manner, a very wide range of frequencies, dependent effectively on only the number of stages in the frequency divider ($n$), is available at the output of the oscillator which will vary in a step-wise manner in accordance with the single input control signal.

In order to derive an output having a frequency which is variable in a continuous fashion over the entire range of frequencies available, the present invention further provides means to vary the frequency of the master oscillator between $f1$ and $f2$ in response to an interpolation signal derived from the input control signal. This interpolation signal varies between a first level and a second level as the input control signal passes through each of said successive differential increments. In this manner, the output frequency of each stage of the frequency divider is adapted to be varied to thereby interpolate the output frequency in a continuous manner between each successive stage of the frequency divider chain in accordance with the following equation:

$$\text{Input control signal} = a \log_N \frac{F_{out}}{f1/N^i} \qquad (1)$$

wherein $a$ is equal to the differential increments of the input control signal mentioned hereinbefore, and $i$ is an integer from 1 to $n$. The term $f1/N^i$ represents the lowest output frequency available from the $i^{th}$ stage of the frequency divider and thus it can be seen that a zero input control signal will produce the lowest frequency output from the oscillator when $i$ is equal to $n$. If negative control signals are available, $i$ may be chosen to be less than $n$ whereby the term $f1/N^i$ will represent the lowest output frequency of one of the preceding stages of the frequency divider chain.

The present invention will be better and more fully understood by referring to the following detailed description along with the drawings in which:

In FIGURE 1 there is illustrated a wide frequency constructed in accordance with the present invention;

Figure 1:
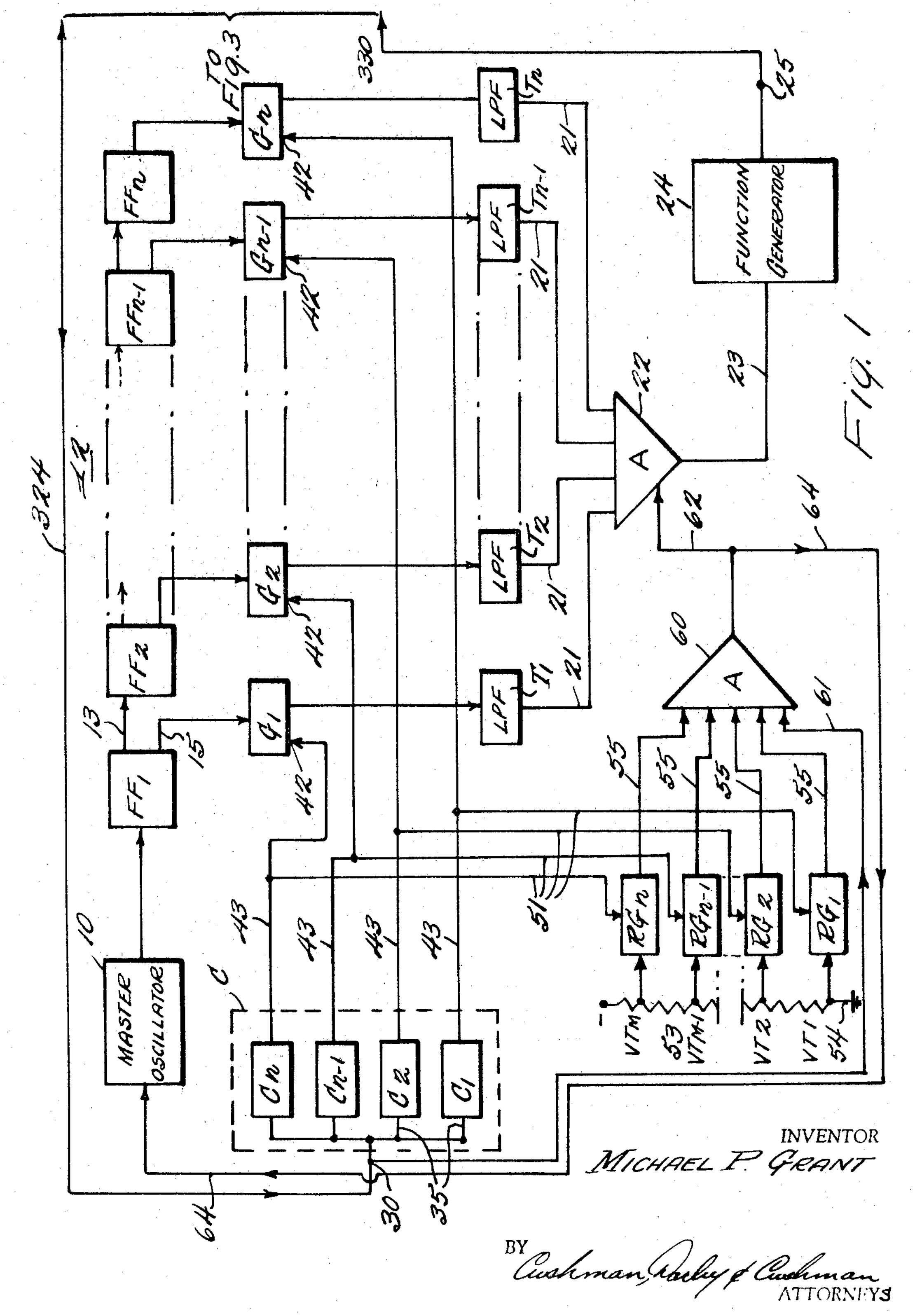
Figure 4:
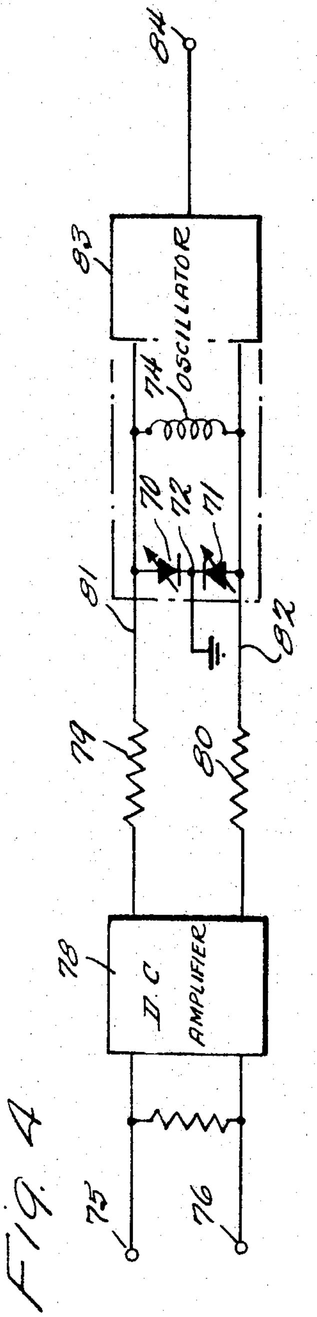
FIGURE 4 is a schematic diagram of a master oscillator suitable for use in the present invention.

In FIGURE 1 there is illustrated a wide frequency range oscillator constructed in accordance with a preferred embodiment of the instant invention and producing either square, triangular, or sinusoidal output waveforms. Variable frequency master oscillator 10 is connected to a binary ($N=2$) counting chain 12 comprising a plurality of bistable flip-flops FF1 to FF$n$, $n$ being equal to the number of stages of the counting chain. The master oscillator may be any suitable variable frequency source, however, in accordance with a preferred embodiment of the present invention, a voltage control oscillator, as shown in FIGURE 4, is employed.

Each of the flip-flops divides the frequency of the input thereto by a factor of 2. In other words, the output frequency of FF1 at the output leads 13 and 15 will be one-half the frequency of the master oscillator. The output frequency of FF2 will be one-fourth of the frequency of the master oscillator and so on, down the chain to FF$n$ which will have an output frequency of $1/2n$ times the frequency of the master oscillator.

The square wave output of each of the flip-flops is connected through gates G1–G$n$ to signal integrating devices such as low pass filters T1 to T$n$ respectively, which process the respective square waves and convert them to triangular wave shapes. Each of these low pass filters is selected to have a relatively long time constant $\tau$ in the order of 100 times the period of the particular square wave connected thereto. Preferably, the time constants of the filters differ from one another by a factor of N, i.e. $\tau_2=N\tau_1$, $\tau_3=N\tau_2$, etc., $\tau_1$, $\tau_2$ and $\tau_3$ being the time constants respectively of filters $T_1$, $T_2$ and $T_3$. In this manner, the output of each of the filters is in the form of a triangular wave having a frequency which is related to the master oscillator and an amplitude which varies in a predictable manner with the input frequency. The triangular wave output of each of the filters is connected via leads 21 to summer amplifier 22. This amplifier may be replaced by a simple "or" circuit if gain control is not required. The triangular wave output of summer amplifier 22 is connected via lead 23 to a function generator 24. The function generator may be of any well known construction such as a triangular-to-sine wave converter, whereby the output at terminal 25 is a sine wave having a frequency corresponding to the output frequency of the particular flip-flop which is connected via its respective gate to the summer amplifier 22.

It is to be understood that the filters, summer amplifier and function generator need not all be required depending on the type of output waveform desired. For example, should a square wave output be desired the filters and function generator may be completely eliminated and a conventional adding circuit may be substituted for the summer amplifier. Alternatively, if a triangular waveform is desired, the function generator may be eliminated. The filters may also be replaced by differentiator circuits to produce a short duration pulse train on the output terminal.

The gates are selectively energized in accordance with the magnitude of the voltage at terminal 30 by dual comparators C1 to C$n$. These comparators may be of any suitable construction which will yield an output only when the input is between two predetermined levels.

Figures 2, 3:
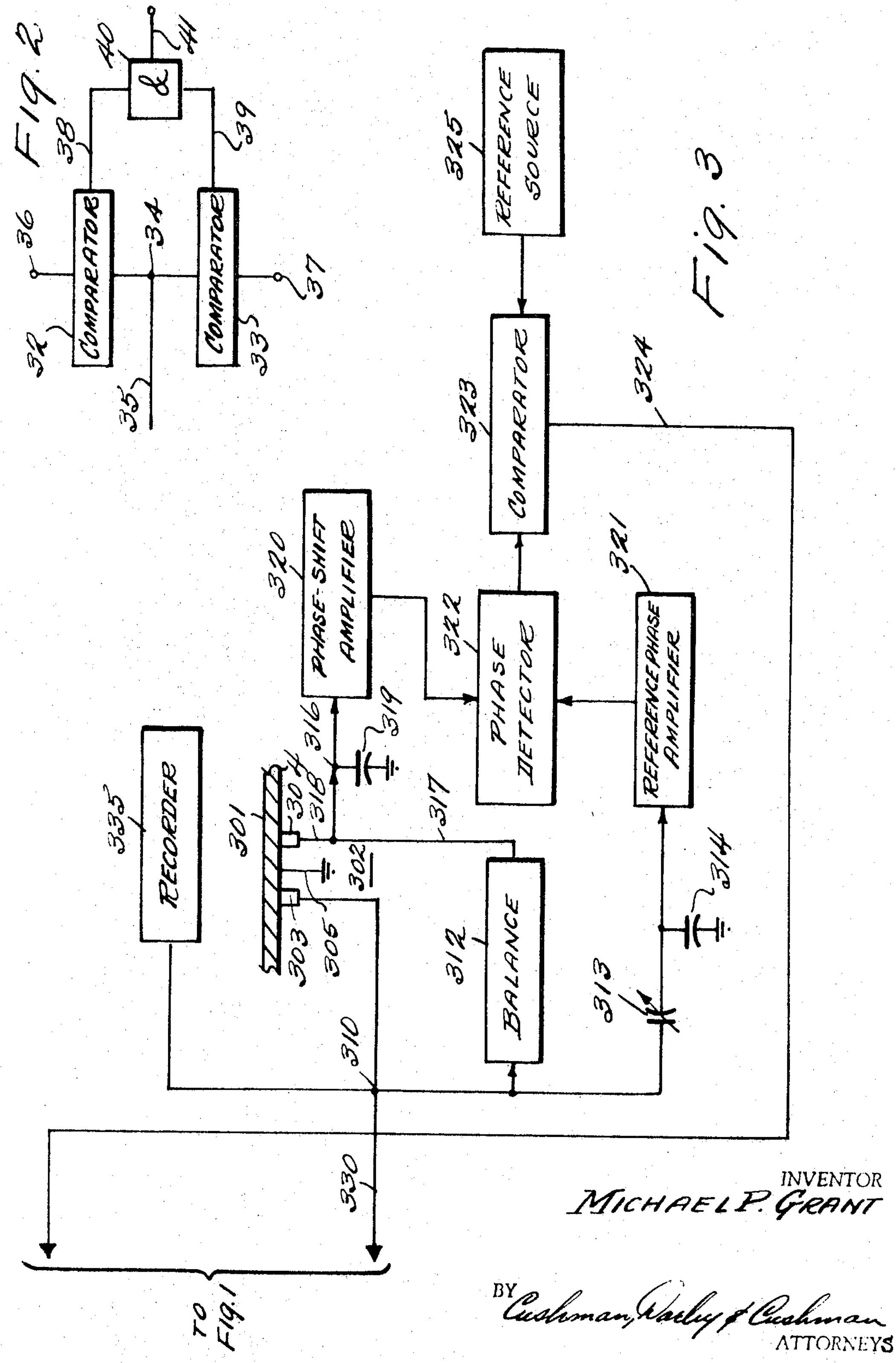
FIGURE 2 is a block diagram of a suitable comparator for use in the present invention.
FIGURE 3 is a block diagram of a constant phase dielectric gauging apparatus.

Comparator C1, as shown in detail in FIGURE 2, is suitable for use in the present invention. As illustrated, comparator C1 includes two conventional voltage comparators 32 and 33, having a common input terminal 34 which is connected to the input terminal 30 by lead 35. The other input terminal 36 of comparator 32 is connected to a source of reference voltage of, for example, 1 volt. The other terminal 37 of comparator 33 is connected to a source of reference voltage of, for example, zero volts. Comparators 32 is of the type which will develop an output voltage on lead 38 only when the input voltage at 34 is less than 1 volt. Comparator 33 will generate an output voltage on lead 39 only when the input at 34 is greater than zero volts. The output of each of these voltage comparators is connected to a well known "and" circuit 40 whereby an output voltage will be generated on lead 41 when a predetermined voltage exists on both input lines 38 and 39. This condition will exist only when the input voltage at 34 is between zero and 1 volt.

Comparators C2 through C$n$ are of the same structure as that shown for comparator C1 and therefore will not be discussed herein in detail. The remaining comparators are illustrated as also having a 1 volt differential range of sensitivity and are arranged in consecutive ascending numerical order from zero to $n$. Although 1 volt ranges of response are shown herein, it is to be understood that other differential ranges, either smaller or larger, may be employed depending on the sensitivity to input voltage variations desired.

The input voltage to the oscillator at terminal 30 is connected to the input of each comparator by leads 35. The output of the comparators C1 to C$n$ are individually connected by leads 43 to the control terminals 42 of gates G$n$ to G1, respectively. In this manner, as the voltage on input terminal 30 increases from zero to $n$ volts, the gates will be successively energized from gates G$n$ to G1, thereby connecting successively greater frequencies to the output terminal 25.

The comparators are set such that only one gate will be energized at any one time. That is to say, the comparators are set to respond to the one-volt interfaces of the input voltage as a break-before-make type of relay.

As the input voltage increases from slightly less than 1 volt to slightly greater than 1 volt, comparator C1 will cut off before the output of comparator C2 becomes energized. The switching can be as accurate as is desired by proper choice of the various components of the comparator. For example, if the voltage comparators of each dual comparator are of the dual, differential transistor type, proper circuit design can afford extremely accurate switching with a minimum of dead time over the 1 volt interface.

The outputs of comparators C1 to C*n* are also connected respectively to a plurality of reference gates RG1 to RG*n* by leads 51. A source of negative direct current voltage (not shown) is connected to terminal 52 of a voltage dividing resistor 53; the other end 54 of this resistor is connected to ground. A plurality of voltage taps VT1–VT*n* provide a plurality of voltages from zero to $n-1$ volts at one-volt intervals. The tapped voltage divider shown here is merely an example of suitable means for producing the reference voltages and it is to be understood that any other suitable means may be employed.

The voltage taps VT1–VT*n* are connected to the reference gates RG1 through RG*n*, respectively. The outputs of these gates are connected by leads 55 to a summer amplifier 60. The input voltage at terminal 30 is also connected to the summer amplifier by a lead 61. The output of this amplifier is connected to summer amplifier 22 by lead 62 to provide forward-feed gain control to this amplifier and is also connected to the input control terminal 63 of the master oscillator 10 via feedback loop 64.

The reference gates are controlled by the comparator C and produce fixed reference voltages equal to the negative of the low end of the respective comparator ranges. The particular reference voltage connected to amplifier 60 in response to a signal from comparator C is summed with the input voltage at terminal 30 in the summer amplifier to produce a zero to one volt interpolation signal for each comparator range. This signal may be fed to the summer amplifier via lead 62 as a gain control voltage to regulate the amplitude of the triangular wave form, and to the master oscillator to vary the frequency thereof. Alternatively, a feedback automatic gain control (AGC) responsive to the output of amplifier 22 may be employed. A 2:1 range of frequency variation of the output of the master oscillator in response to the interpolation signal is required when a binary counting chain, as shown, is employed, since the frequencies of successive stages are related by a factor of 2. The frequency of the voltage passing through each filter will therefore vary over a similar 2:1 range which will cause a 2:1 variation in the amplitude of the output of each filter. The output of amplifier 60 is therefore connected to the amplifier 22 to provide a 2:1 gain control in order to regulate the amplitude of the triangular wave form. If a tertiary counter is used the range of frequency variation of the master oscillator must, of course, be 3:1 ($N=3$) and therefore the gain control must similarly be a 3:1 gain control, in order to effect a continuous variation of the output frequency.

The feedback loop here represented by line 64 may include elements of a servomechanism (not shown) comprising motor means for mechanically adjusting a variable frequency control element in oscillator 10. In accordance with a preferred embodiment of the instant invention however, the oscillator 10 is a voltage-controlled oscillator of the type shown in FIGURE 4 and line 64 represents a voltage feedback circuit.

This oscillator shown in FIGURE 4 is a conventional varactor type of oscillator comprising voltage sensitive, variable capacitance diodes 70 and 71 which are connected in back-to-back relationship. The junction 72 of these diodes is connected to a reference potential such as ground. The tank circuit of a conventional oscillator 73 comprises the parallel LC combination of inductor 74 and the diodes 70 and 71. Terminals 75 and 76 are adapted to receive the interpolation signal from amplifier 60 (FIGURE 1). This interpolation signal is amplified by a DC amplifier 78 and fed through resistors 79 and 80 and leads 81 and 82 to the oscillator 73. The aforementioned L*c* tank circuit is connected between leads 81 and 82. The output terminal 84 of oscillator 73 is adapted to be connected to the first flip-flop of the counting chain 12 in FIGURE 1. The output frequency of such an oscillator will vary in accordance with the log of the interpolation signal due to the inherent logarithmic characteristic of the varactor.

For the purpose of describing the operation of the oscillator shown in FIGURE 1, *n* will be taken to be 10 and the frequency range of oscillator 10 will be from 512 kc. to 1.024 mc. In operation, therefore, as the input voltage on terminal 30 increases from zero to 1 volt, for example, gate G*n* will be energized to pass the output of flip-flop FF*n* through low pass filter T*n*, summer amplifier 22, and function generator 24 to the output terminal 25. Reference gate RG1 will also be energized to connect a zero volt reference signal to summer amplifier 60. As the input voltage on line 61 varies from zero to one volt, the output of summer amplifier 60 therefore will similarly vary between zero and one volt. This zero to one volt variation will, in turn, cause the output frequency of the master oscillator to vary from 512 kc. to 1.024 mc. Flip-flop FF*n* is the last flip-flop in the counting chain, and therefore the output frequency thereof will vary between 500 c.p.s. and 1 kc. in a logarithmic fashion. When input voltage exceeds 1 volt, comparator C1 will no longer have an output and gate G*n* will be deenergized. Comparator C2, however, is responsive to a voltage between 1 and 2 volts and therefore will energize gate G*n*–1. The output of comparator C2 will also energize reference gate RG2 to supply a $-1$ volt reference potential to summer amplifier 60. As the input voltage on line 61 continues to vary from 1 to 2 volts, the output of amplifier 60 will vary between zero and 1 volt to again cause the master oscillator to vary from 512 kc. to 1.024 mc. and the output frequency will vary between 1 to 2 kc. This process is the same for the remaining comparators as the voltage continues to increase. When the input voltage exceeds 9 volts, the comparator C*n* causes gate G1 to pass the output from FF1 to the output terminal at a frequency of 256 kc. As the voltage continues to increase to 10 volts, the interpolation signal will cause the master oscillator frequency to increase to 1.024 mc. at which time the output voltage at terminal 25 will have a frequency of 512 kc. Thus, it can be seen that the oscillator of the present invention provides a continuous variation in output frequency from, for example, 500 c.p.s. to 512 kc. in response to a single input control signal, and further, the output frequency is a logarithmic function of the input control in accordance with Equation 1, supra. In the above described example, the value of the terms in Equation 1 are as follows:

$$a=1,\ N=2,\ n=10,\ f1=512\ kc.$$

Substituting these values in equation we have:

$$E_{in}=\log_2 \frac{F_{out}}{500} \qquad (2)$$

$E_{in}$ represents a voltage input control signal. From Equation 2, it can be seen that as $E_{in}$ varies between zero and 10 volts, the output frequency will vary from 500 c.p.s. to 512 kc. in accordance with the logarithm to the base 2 of $E_{in}$.

This wide range logarithmic, frequency response to a single input control is of particular usefulness in the dielectric gauging apparatus shown in FIGURE 3 which is a simplified diagram of a constant-phase measuring system of the type particularly described in the aforementioned copending application. The numeral 301 indicates a dielectric material having a variable property to be measured. It may be assumed that the material is the output product of a continuous manufacturing process for forming the material in a continuous length which passes adjacent to a probe 302. The probe comprises a pair of spaced electrodes 303 and 304 which are normally arranged on the same side of the traveling material 301 and with a grounded guard electrode 305 between the principal probe electrodes 303 and 304. The electrodes are supported by a suitable mechanical structure (not shown) whereby the probe electrodes are maintained in a physical contact with the material 301, using a light pressure so as to avoid physical damage to the material.

The probe 302 is energized with an alternating input voltage which is adapted to be connected to terminal 310. The input voltage is also applied to a balance circuit 312 and a reference phase shift circuit comprising capacitors 313 and 314.

The balance circuit is provided to null the voltage at junction 316 when the probe is removed from the material, by producing a signal on lead 317 which is equal and opposite in phase to the signal on lead 318. When the probe is then placed in contact with the material 301, the voltage on lead 318 will be shifted in phase an amount proportional to the dielectric constant of the material. The voltage across capacitor 319 will thereby increase an amount proportional to the phase shift introduced by the material 301 and will be amplified by amplifier 320.

The signal appearing across capacitor 314 will be shifted in phase from the input signal a fixed amount which is determined by capacitor 313. This signal will be amplified by reference phase amplifier 321 and fed to a phase detector 322. The output of amplifier 320 is also connected to the phase detector. The phase difference detector will generate an output voltage proportional to the phase difference between the reference signal from amplifier 321 and the variable phase signal from amplifier 320.

A voltage comparator 323 is provided to generate a voltage on lead 324 proportional to the difference between a reference voltage from source 325 and the output of phase detector 322. The output of the voltage comparator is connected in a feedback relationship to vary the frequency of the input voltage in a manner to be explained hereinafter. Frequency responsive means, may, of course, be inserted between capacitor 314 and amplifier 321 to increase the range of frequency response of the system as disclosed in application Ser. No. 563,466, supra.

It has been determined that the phase shift introduced by material 301 is proportional to the frequency of the voltage source. Therefore, by controlling the frequency of the source in accordance with the voltage from comparator 323 it can be seen that the phase shift introduced by the material 301 can be maintained at a constant value. This procedure, in effect, converts the phase shift variations caused by the material into frequency variations which can be more accurately and sensitively monitored than the actual phase shift changes.

As mentioned hereinbefore, the oscillator of the present invention is particularly well suited for use in such gauging apparatus and is adapted to be connected therein by connecting the output of the oscillator at terminal 25, via lead 330, to the voltage input terminal 310 of the gauging apparatus. The feedback voltage from comparator 323 is connected via lead 324 to input terminal 30 of the oscillator (FIGURE 1). In this manner the feedback voltage will cause the output frequency on terminals 25 and 310 to vary as a logarithmic function of said feedback signal to thereby maintain the phase shift introduced by the material 301 at a constant magnitude. The magnitude of the frequency of the voltage at terminals 25 and 310 therefore will be proportional to the dielectric constant of the material 301.

If the moisture content of the material is the characteristic of interest, the output frequency of the oscillator may be directly recorded by recorder 335 as it is a linear function of the moisture content since the moisture content is proportional to the log of the feedback signal on terminal 30.

Although a voltage feedback between comparator 323 and the oscillator input terminal 30 is shown, it is to be understood that an electro-mechanical servo feedback arrangement could also be employed such as an electric servo motor adapted to drive a tap of a variable potentiometer to provide the variable input voltage on input terminal 30 in accordance with the output from comparator 323.

Figure 5:
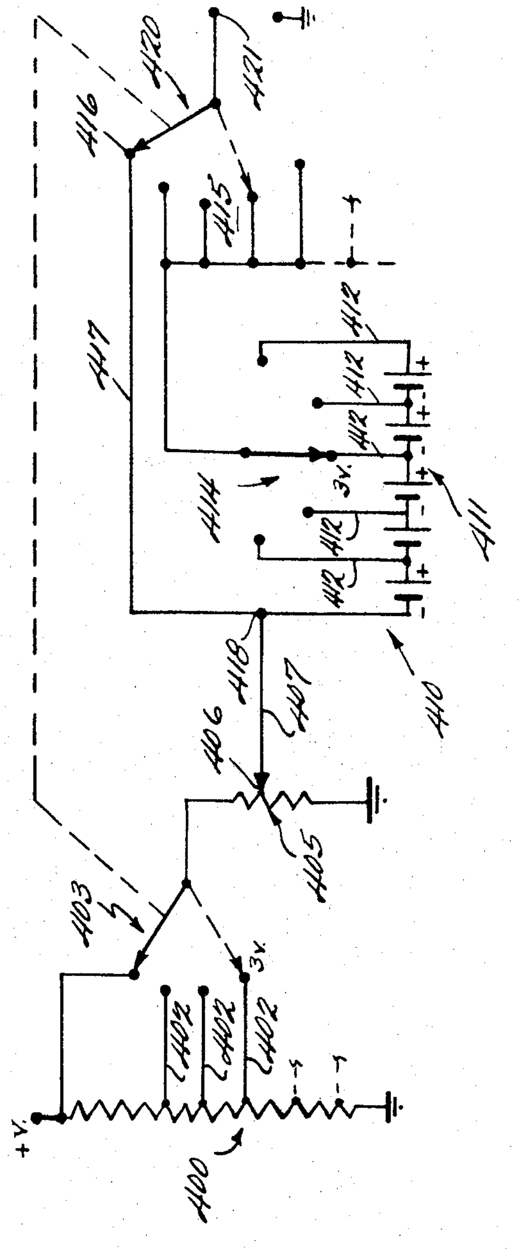
FIGURE 5 is a schematic diagram of a manual input control suitable for use with the oscillator of the present invention.

FIGURE 5 shows a manual control suitable for use with the oscillator as shown in FIGURE 1 which provides considerable versatility in the control of such an oscillator. This manual control system allows for the selection of part or all of the entire frequency range of the oscillator to be available in response to the full swing of an input manual control such as a knob. It is also contemplated that this control system may be used in a servo feedback loop from the output comparator 33 (FIGURE 3) and the input terminal 25 of the oscillator shown in FIGURE 1 to provide the input control signal for the oscillator.

The manual control system comprises a voltage dividing resistor 400 connected between a source of voltage (not shown) and ground. This voltage dividing resistor is provided with a plurality of voltage taps 402. A selector switch 403 is adapted to connect the various voltage taps through a frequency control potentiometer 405 to ground. The variable voltage tap 406 of potentiometer 405 is connected via lead 407 to a switch 410. The switch 410 comprises a voltage source 411 having a plurality of output voltage leads 412. A switch 414 is adapted to selectively connect the various output voltage leads to a plurality of ganged terminals 415. A full range output terminal 416 is also provided and is directly connected via lead 417 to junction 418. A switch 420 is provided to selectively connect terminals 416 and 415 to the output terminal 421 and is mechanically ganged with switch 403.

This switching arrangement shown in FIGURE 5 is adapted to provide the input control for the oscillator as shown in FIGURE 1 by connecting the output terminal 421 (FIGURE 5) to the input terminal 30 (FIGURE 1). In this manner the full range of output frequency of the oscillator is obtained by placing switches 403 and 420 in the full line position shown. This will provide a full range of input voltage from V volts to zero as the variable voltage tap 406 is moved from the top of potentiometer 405 to the bottom. The magnitude of the voltage V is determined by the maximum voltage to which the comparator C*n* (FIGURE 1) will respond.

Should it be desired to have only a fraction of the full frequency range of the oscillator be generated in response to a full swing of the variable voltage tap 406, the switches 403, 414 and 420 may be adjusted to achieve this result. For example, should only the 3rd through 5th octaves (an octave being the frequency range of one stage of the counting chain) be desired, which corresponds to an input voltage of 3–6 volts, the switches 403 and 420 are placed in the dotted line position shown and switch 414 is set to connect the 3-volt output terminal 412 to terminals 415. With the switches in this position, the output voltage on terminal 421 with the variable voltage tap at the top of potentiometer 405, will be 6 volts (the sum of the 3 volts on switch 403 and the 3 volts on switch 414). As the variable voltage tap 406 is moved to the lowermost position, the output voltage will decrease to 3 volts, since in the lower position the voltage tap 406 will be at ground potential thereby leaving the 3 volts at switch 414 the only voltage source connected to the output terminal.

From the foregoing description of the oscillator of the instant invention, it should be apparent to those skilled in the art that frequency dividers other than binary counting chains, as shown in FIGURE 1, may be employed depending on the functional relationship between the input and output desired. Similarly, it should be apparent that the voltage ranges to which the comparators C1 to C$n$ respond may be other than the one-volt intervals suggested, again depending on the functional relationship between the input and output desired. It is further to be understood that although a voltage responsive system has been disclosed as a preferred embodiment of the present invention, a current responsive system is also contemplated. The conversion of the system shown to a current responsive system is within the ability of one skilled in the art and therefore it is not deemed necessary to describe this procedure. The apparatus, as hereinbefore shown and described, is further not intended to exclude from within the scope of the claims appended hereto, systems of the type described which are responsive to a characteristic of the input control signal, such as the phase or frequency thereof.

It will further be apparent to those of ordinary skill in the art that this invention is amenable to other modifications with respect to mechanical components, circuitry and electrical components and hence, may be given embodiments other than those particularly illustrated and described herein without departing from the essential features of the present invention and within the scope of the claims appended hereto.

What is claimed is:

1. A wide frequency range oscillator having an input terminal adapted to receive an input control signal having a characteristic that may be varied, and an output terminal comprising, a master oscillator, means connected to said master oscillator for generating a plurality of signals of different frequencies, and means responsive to said input control signal for selectively connecting said signals to said output terminal one at a time in accordance with the instant value of said control signal characteristic to obtain an output signal frequency in the range of said different frequencies.

2. The apparatus of claim 1, wherein said control signal responsive means comprises a plurality of comparators having inputs connected to said input terminal and being respectively responsive to different values of said control signal characteristic for generating respective outputs, and means responsive to said comparator outputs for gating said plurality of signals to said output terminal one at a time in accordance with the instant value of said control signal characteristic.

3. The apparatus of claim 1 further comprising a plurality of integrating means operative on respective ones of said different frequency signals, each of said integrating means having a relatively long time constant with respect to the period of the respective signal adapted to pass therethrough.

4. A wide frequency range oscillator having an input terminal adapted to receive an input control signal, having a characteristic that may be varied and an output terminal, comprising, a variable frequency master oscillator, means connected to said master oscillator for generating a plurality of signals of different frequencies, control signal responsive means connected to said input terminal, selector means connected to said control signal responsive means for selectively connecting one of said plurality of signals to said output terminal in accordance with different values of said input control signal characteristic, means connected to said control signal responsive means for producing an interpolation signal, variable between first and second predetermined levels in response to said different values of said input control signal characteristic, and means for varying the frequency of said master oscillator in accordance with said interpolation signal.

5. The apparatus of claim 4 wherein said means for producing an interpolation signal comprises, a plurality of reference signals corresponding to the negative of each of said different values of said input control signal characteristic, a pluralty of gate means and summing means, said gate means being adapted to connect respective ones of said reference signals to said summing means in accordance with said different values of said control signal characteristic, and means connecting said control signal to said summing means whereby the output of said summing means comprises said interpolation signal.

6. A wide frequency range oscillator having an input terminal adapted to receive an input control signal, and an output terminal comprising, a variable frequency master oscillator, a frequency divider chain adapted to be driven by said master oscillator, said frequency divider chain having $n$ stages, the output of each stage having respective frequencies of $1/N^i$ times the frequency of said master oscillator, wherein N is the division factor of each stage and $i$ is an integer from 1 to $n$, means for selectively connecting the output of one of said $n$ stages to said output terminal in accordance with predetermined intervals of said control signal, and means to vary the frequency of said master oscillator over an $N:1$ range of frequencies as said control signal passes through said predetermined intervals.

7. The apparatus of claim 6 wherein said means for varying the frequency of said master oscillator comprises, means for producing an interpolation signal variable between first and second predetermined values in response to said predetermined intervals of said control signal and means responsive to a variation in said interpolation signal from said first predetermined value to said second predetermined value, for varying the frequency of said master oscillator over said range of frequencies.

8. A wide frequency range oscillator having an input terminal adapted to receive an input control signal and an output terminal, comprising, a variable frequency master oscillator, a frequency divider chain connected to said master oscillator, said frequency dividing chain having $n$ stages, wherein each of said stages divides the frequency input thereto by a factor of N, input signal responsive means connected to said input terminal, selector means connected to said input signal responsive means for selectively connecting the output of one of said $n$ stages to said output terminal in accordance with successive differential intervals of said input control signal, means connected to said input signal responsive means for producing an interpolation signal variable between first and second predetermined values as the input control signal passes through each of said differential intervals, and means for varying the frequency of said master oscillator over an $N:1$ range of frequencies in response to a variation in said interpolation signal from said first predetermined value to said second predetermined value.

9. The apparatus of claim 8 wherein said control signal responsive means comprises, a plurality of comparators each having an input connected to said input terminal and an output, each of said comparators being responsive to a different one of said successive differential intervals of said control signal for generating an output signal, and wherein said selector means comprises a plurality of gates connected between respective ones of said $n$ stages and said output terminal, and means connecting the outputs from said plurality of comparators to respective ones of said plurality of gates for selectively opening one of said gates in response to an output signal from its associated comparator.

10. The apparatus of claim 8 wherein said control signal responsive means comprises, a plurality of comparators each having an input connected to said input terminal and an output, each of said comparators being responsive to a different one of said successive differential intervals of said control signal for generating an output signal, and further wherein said means for producing an interpolation signal comprises a plurality of reference signals corresponding to the lower end of each of said differential intervals of said input control signal, a summer amplifier, a plurality of gates connected between respective ones of said reference signals and said summer amplifier, means connecting the output of said comparators to respective ones of said gates for selectively connecting said plurality of reference signals to said summer amplifier and means connecting said control signal to said summer amplifier whereby the output from said summer amplifier comprises said interpolation signal.

11. The apparatus of claim 8 further comprising a plurality of low-pass filter means, a summer amplifier and a function generator, means connecting said plurality of low-pass filter means between respective ones of said plurality of stages and said summer amplifier, means connecting said function generator between said output terminal and the output from said summer amplifier and means connecting said interpolation signal to said summer amplifier to provide an $N:1$ gain control of said summer amplifier.

12. The apparatus of claim 8 wherein said frequency divider comprises a binary counting chain having $n$ stages for producing an output signal on said output terminal having a frequency, $F_{out}$, related to said control signal in accordance with the equation:

$$\text{Input control signal} = a \log_2 \frac{F_{out}}{f1/2^n}$$

where $a$ is equal to the differential increments of said control signal and $f1$ is the frequency of said master oscillator when said interpolation signal is equal to said first predetermined level.

13. The apparatus of claim 8 wherein said master oscillator is a voltage controlled oscillator comprising a varactor whereby the frequency of said master oscillator is a logarithmic function of said interpolation signal.

14. The apparatus of claim 8 further having means for providing mechanical control of said input control signal comprising, means for producing a first plurality of fixed signals, a frequency determining potentiometer having a variable voltage tap, first switch means adapted to selectively connect said potentiometer between a reference potential in one of said first plurality of fixed signals, means for producing a second plurality of fixed signals, and second switch means adapted to selectively connect each of said second plurality of fixed signals in series between said variable voltage tap and said input terminal.

15. An oscillator for producing a wide range of frequencies logarithmically related to a single input control signal, comprising, an input terminal adapted to receive said control signal, an output terminal, an $n$ stage counting chain where $n$ is an integer, the counting mode of each of said stages being N, a variable frequency master oscillator for driving said counting chain, means responsive to successive differential increments of said control signal for selectively connecting the output from one of said stages to said output terminal, means for generating an interpolation signal variable between first and second predetermined values each time said control passes through one of said differential increments, and means for connecting said interpolation to said master oscillator for varying the frequency thereof over an $N:1$ range of frequencies, whereby the frequency, $F_{out}$, of the signal on said output terminal is related to said control signal by the equation:

$$\text{Control signal} = a \log_N \frac{F_{out}}{f1/N^i}$$

wherein $a$ is a constant equal to said differential increments of said control voltage, $f1$ is the frequency output of said master oscillator when said interpolation signal is equal to said first predetermined value, and $i$ is an integer representing the $i^{th}$ stage of said counting chain, $i$ being an integer from one to $n$.

16. The apparatus of claim 15 wherein $i$ is equal to $n$, the number of the last stage of the counting chain, whereby the lowest frequency output available on said output terminal will be generated in response to a zero value control signal.

17. An apparatus for quantitative determination of a variable property of a dielectric material comprising, a probe having spaced electrodes electrically coupled to said material, a variable frequency alternating voltage source connected to said probe for producing an electrical current through said probe having a phase shift with respect to said alternating voltage which tends to vary with changes in said variable property, means for producing a phase shift deviation signal representing a deviation in said phase shift from a reference value, feedback means for varying the frequency of said alternating voltage in accordance with said phase deviation signal whereby said phase deviation signal is reduced to zero, wherein said variable frequency alternating voltage source comprises an oscillator for producing a wide range of frequencies logarithmically related to said phase deviation signal, said oscillator having a variable frequency master oscillator, an $n$ stage counting chain for producing a plurality of alternating signals having respective frequencies of $1/N^i$ times the frequency of the master oscillator, where N is the counting mode of each of said stages and $i$ is an integer from one to $n$, and means for selectively connecting the output of one of said stages to said probe in accordance with predetermined differential increments of said phase deviation signal.

18. The apparatus of claim 17 wherein means are provided for varying the frequency of said master oscillator over an $N:1$ range of frequencies as said phase deviation signal passes through each of said predetermined differential increments, whereby the frequency, $F_{out}$, of the alternating voltage on said output terminal is related to said phase deviation signal in accordance with the equation:

$$\text{Phase deviation signal} = a \log_N \frac{F_{out}}{f/N^n}$$

where $a$ is equal to said differential increments of the phase duration signal, $f$ is the lowest frequency of said master oscillator.

19. The apparatus of claim 17 wherein means are provided for directly recording the magnitude of the frequency output of said wide frequency range oscillator as a measurement of said variable property.

20. A wide frequency range oscillator having an input terminal adapted to receive an input control signal having a characteristic that may be varied, and an output terminal comprising, a master oscillator, means connected to said master oscillator for generating a plurality of signals of different frequencies, means responsive to said input control signal for selectively connecting said signals to said output terminal one at a time in accordance with the instant value of said control signal characteristic to obtain an output signal frequency in the range of said different frequencies, and means for changing the operating frequency of said master oscillator, and accordingly of said different frequency signals, in accordance with changes in the value of said control signal characteristic to control the frequency of the output signal.

21. The apparatus of claim 20 including respective means for processing said plurality of different frequency signals whereby the amplitude of each such signal changes with changes in frequency thereof, and means operative in accordance with changes in said control signal to regulate the amplitude of the processed signals to cause the output signal to be of substantially constant amplitude.

References Cited

UNITED STATES PATENTS 3,349,338 10/1967 Sosin ---------------- 331—18

JOHN KOMINSKI, Primary Examiner.

U.S. Cl. X.R.

328—14, 145; 331—49, 51, 177

UNITED STATES PATENT OFFICE
CERTIFICATE OF CORRECTION

Patent No. 3,467,861 Dated September 16, 1969

Inventor(s) Michael F. Grant

It is certified that error appears in the above-identified patent and that said Letters Patent are hereby corrected as shown below:

Column 3, line 35, delete entire line and substitute -- FIGURE 1 is a schematic diagram of an oscillator--.

Signed and sealed this 11th day of January 1972.

(SEAL)
Attest:

EDWARD M.FLETCHER,JR.
Attesting Officer

ROBERT GOTTSCHALK
Acting Commissioner of Patents